(12) United States Patent
Rehmeyer et al.

(10) Patent No.: US 12,073,108 B2
(45) Date of Patent: Aug. 27, 2024

(54) MEMORY PLACEMENT IN A COMPUTING SYSTEM

(71) Applicant: Micron Technology, Inc., Boise, ID (US)

(72) Inventors: James S. Rehmeyer, Boise, ID (US); Christopher G. Wieduwilt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 135 days.

(21) Appl. No.: 17/833,718

(22) Filed: Jun. 6, 2022

(65) Prior Publication Data

US 2023/0066587 A1 Mar. 2, 2023

Related U.S. Application Data

(60) Provisional application No. 63/239,764, filed on Sep. 1, 2021.

(51) Int. Cl.
*G06F 3/06* (2006.01)
*G06F 13/16* (2006.01)

(52) U.S. Cl.
CPC .......... *G06F 3/0653* (2013.01); *G06F 3/0604* (2013.01); *G06F 3/0679* (2013.01); *G06F 13/1668* (2013.01)

(58) Field of Classification Search
CPC .... G06F 3/0653; G06F 3/0604; G06F 3/0679; G06F 13/1668
USPC ............................................................. 710/8
See application file for complete search history.

(56) References Cited

U.S. PATENT DOCUMENTS

| | | | |
|---|---|---|---|
| 6,639,820 B1 | 10/2003 | Khandekar et al. | |
| 8,400,765 B2 | 3/2013 | Ross | |
| 9,949,409 B2 | 4/2018 | Schmidtke et al. | |
| 10,474,774 B2* | 11/2019 | Acar | G06F 30/367 |
| 2012/0124590 A1* | 5/2012 | Balakrishnan | G06F 1/3275 718/103 |
| 2013/0232347 A1* | 9/2013 | Pinto | H03K 19/0016 713/300 |
| 2017/0045930 A1* | 2/2017 | Robson | G06F 11/00 |
| 2017/0357463 A1* | 12/2017 | Muralimanohar | G06F 11/3058 |
| 2018/0088639 A1* | 3/2018 | Remis | G06F 9/44505 |
| 2020/0257343 A1* | 8/2020 | Shabbir | G06F 1/206 |
| 2020/0285298 A1* | 9/2020 | Basu | G06F 1/3275 |

\* cited by examiner

*Primary Examiner* — Christopher B Shin
(74) *Attorney, Agent, or Firm* — Brooks, Cameron & Huebsch, PLLC

(57) ABSTRACT

Apparatuses and methods can be related to placing memory in a computing system. The memory modules can be placed in memory slots to couple the memory modules to the computing system. The memory modules and/or the memory slots can have thermal qualities which can be utilized to determine which of the memory modules are placed on which of the memory slots.

16 Claims, 6 Drawing Sheets

MEMORY PLACEMENT IN A COMPUTING SYSTEM

PRIORITY INFORMATION

This application claims benefit of U.S. Provisional Application Ser. No. 63/239,764, filed on Sep. 1, 2021, the contents of which are incorporated herein by reference.

TECHNICAL FIELD

The present disclosure relates generally to memory, and more particularly to apparatuses and methods associated with placing memory in a computing system

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
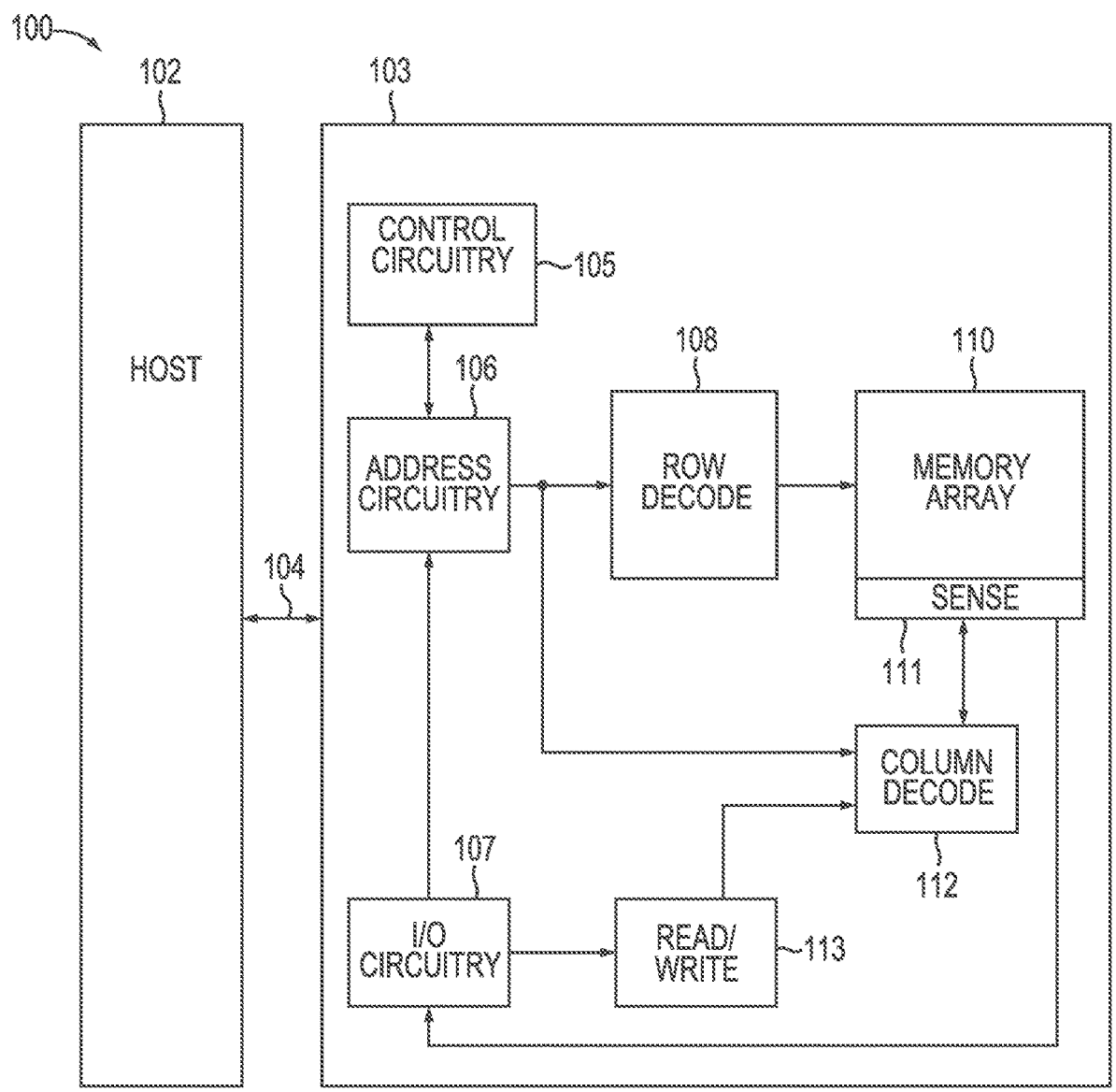
FIG. 1 is a block diagram of an apparatus in the form of a computing system including a memory device in accordance with a number of embodiments of the present disclosure.

The present disclosure includes apparatuses and methods related to placing memory in a computing system. In various examples, the placement of memory (e.g., memory modules or memory devices) within a computing system can influence the power consumption of the computing system and can improve performance of the computing system.

Memory modules can have a performance rating of an operating parameter indicating how effectively semiconductor die (e.g., memory device) operate at higher temperatures (e.g., how much the operating parameter of the memory module changes at higher temperatures, a raw score for the operating parameter at higher temperatures, etc.). In various embodiments, the operating parameter can be power consumption of the semiconductor die and/or the memory module, data retention of the semiconductor die, speed of the semiconductor die and/or some combination therein. The performance rating can be a value, a category, and/or a class, among other representations of the operating parameter (e.g., power consumption, data retention, and/or speed).

As used herein, a memory module can include a substrate (e.g., printed circuit board) having a first surface and a second surface opposite the first surface and memory devices (e.g., semiconductor die) coupled thereto. As used herein, the terms semiconductor die and memory device are used interchangeably. The memory devices can be coupled to the surfaces of the substrate via an array area configured to receive the memory devices. The memory modules can be coupled to the memory system via memory slots. The memory slots can comprise a physical interface that couples the memory module to the computing system. For example, the memory slots can comprise edge connectors that couple the memory module to the computing system.

Memory slots can be assigned a classification such as a cold classification or a hot classification based on the thermal qualities of the memory slots at operation of a computing system and/or the memory slots. Although a binary classification (e.g., cold/hot) is utilized for the examples describe herein, other classifications can be used to describe the thermal qualities of the memory slots at operation. The classifications "cold" or "hot" can be utilized to compare various of the memory slots against others of the memory slots. For example, a first memory slot can be compared to a second memory slot such that the first memory slot is provided a cold classification and the second memory slot is provided a hot classification. Such a classification can indicate that the thermal qualities of the first memory slot and the second memory slot are such that the first memory slot is colder than the second memory slot at operation.

The placement of the memory modules in the memory slots can affect the performance of the computing system and the power utilization of the computing system. For example, certain of the memory modules, when coupled to certain of the memory slots, can utilize more power and/or can function slower than if the certain of the memory modules were coupled to other of the memory slots.

Aspects of the present disclosure address the above and other deficiencies. Performance ratings of operating parameters affected by temperature can be assigned for individual memory modules of a computing system. The memory modules can be coupled to a computing system based on the performance ratings and based on a classification of the memory slots to conserve power and to improve a speed of the function of the memory modules.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2. Analogous elements within a Figure may be referenced with a hyphen and extra numeral or letter. See, for example, elements 220-1, 220-2 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory device 103 in accordance with a number of embodiments of the present disclosure. As used herein, a memory device 103, memory array 110, and/or a host 102, for example, might also be separately considered an "apparatus."

In various example, the computing system 100 includes a host 102 coupled to memory device 103 via an interface 104. The memory device 103 can be coupled to a memory module which is coupled to the computing system 100 via the interface 104 The computing system 100 can be a personal laptop computer, a desktop computer, a digital camera, a mobile telephone, a memory card reader, or an Internet-of-Things (IoT) enabled device, among various other types of systems. The host 102 can include a number of processing resources (e.g., one or more processors, microprocessors, or some other type of controlling circuitry) capable of accessing the memory device 103. The computing system 100 can include separate integrated circuits, or both the host 102 and the memory device 103 can be on the same integrated circuit. For example, the host 102 may be a system controller of a memory system comprising multiple memory devices 103, with the system controller providing access to the respective memory devices 103 by another processing resource such as a central processing unit (CPU).

In the example shown in FIG. 1, the host 102 is responsible for executing an operating system (OS) and/or various applications that can be loaded thereto (e.g., from memory device 103 via control circuitry 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the computing system 100 has been simplified to focus on features with particular relevance to the present disclosure. The memory array 110 can be a DRAM array, SRAM array, STT RAM array, PCRAM array, TRAM array, RRAM array, NAND flash array, NOR flash array, and/or 3D Cross-point array for instance. The memory array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory arrays arraigned in banks of the memory device 103.

The memory device 103 includes address circuitry 106 to latch address signals provided over an interface 104. The interface can include, for example, a physical interface (e.g., a data bus, an address bus, and a command bus, or a combined data/address/command bus) employing a suitable protocol. The physical interface can also include a memory slot to which a memory module comprising the memory device 103 is coupled. The physical interface can also include an array area to which the memory device 103 is directly coupled. Such protocol may be custom or proprietary, or the interface 104 may employ a standardized protocol, such as Peripheral Component Interconnect Express (PCIe), Gen-Z interconnect, cache coherent interconnect for accelerators (CCIX), or the like. Address signals are received and decoded by a row decoder 108 and a column decoder 112 to access the memory arrays 110. Data can be read from memory arrays 110 by sensing voltage and/or current changes on the sense lines using sensing circuitry 111. The sensing circuitry 111 can be coupled to the memory arrays 110. Each memory array and corresponding sensing circuitry can constitute a bank of the memory device 103. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory arrays 110 or read data from the memory arrays 110. As an example, the read/write circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory array 110 and/or from the memory array via the data lines coupling the memory array 110 to the I/O circuitry 107.

In various instances, the memory device 103 can be utilized to store performance ratings of operating parameters and/or classification of memory slots of the memory device 103, a different memory device, and/or a memory module. The host 102 can be configured to access the memory performance ratings and/or the memory slots to determine which of the memory modules and/or memory devices are coupled to which of the memory slots and/or and mounts. As used herein, mounts can describe a physical interface utilized to couple memory devices directly to the computing system 100 without the utilization of a memory module. The memory devices of the memory module and/or the memory module can be described as a memory system or a memory sub-system.

Figure 2:
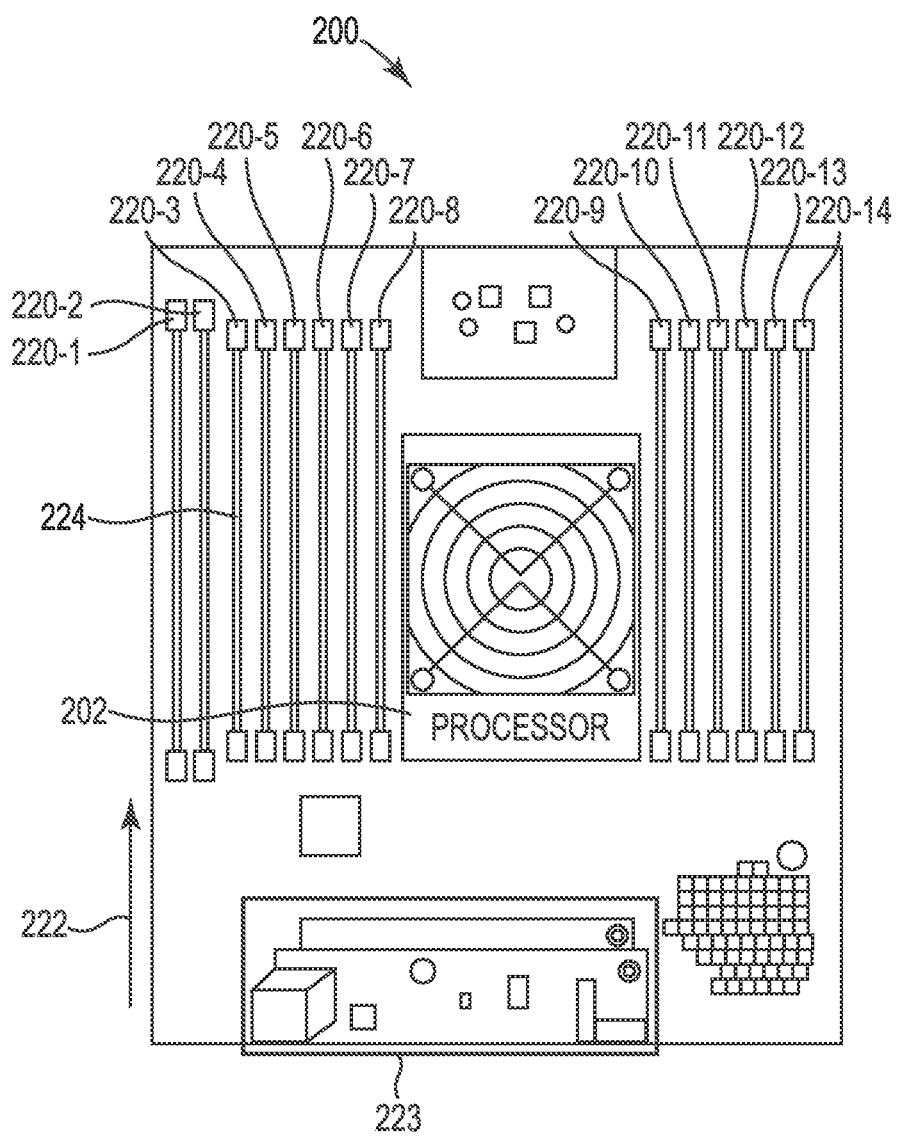
FIG. 2 illustrates a block diagram of an apparatus in the form of a computing system in accordance with a number of embodiments of the present disclosure.

FIG. 2 illustrates a block diagram of an apparatus in the form of a computing system 200 in accordance with a number of embodiments of the present disclosure. The computing system 200, referred to herein as system 200, can include various components. The components include a processor 202, memory modules 224, memory slots 220-1 to 220-14, and memory devices 223 among other components that can be implemented in the system 200.

The memory modules 224 can be coupled to the system 200 via the memory slots 220-1 to 220-14, referred to herein as memory slots 220. Each of the memory modules 224 can be coupled to a different one of the memory slots 220 via a physical interface comprised of pins of the memory modules 224 and connectors of the memory slots 220. In various examples, each of the memory modules 224 can be coupled to a different one of the memory slots 220 but each of the memory slots 220 may not be coupled to one of the memory modules 224. For example, the memory slots 220-1, 220-2 are not coupled to one of the memory modules 224 while the other memory slots 220-3 to 220-14 are coupled to the memory modules 224. However, in various instances, each of the memory slots 220 can be coupled to one of the memory modules 224.

Each of the memory slots 220 can be assigned a thermal category. The thermal categories can be evaluated based on the running conditions of the system 200. The system 200 can comprise heating elements and cooling elements. For example, certain of the components of the system 200 can generate heat while other of the components of the system 200 can cool the system 200. For example, the memory modules 224, the devices 223, and the processor 202 can generate heat, among other components of the memory system 200. The system 200 can also include cooling components such as fans (e.g., not shown) that can cool the system 200. For instance, the system 200 can include a system fan and/or a processor fan that can cool the system 200 and/or the processor 202.

Although the examples described herein are provided in the context of fans other types of cooling components can be utilized to cool the system 200. For example, the system 200 can be cooled utilizing different air cooling components. Air cooling components can include devices that move air actively to cool the system 200. Air cooling components can include fans. The system 200 can be cooled passively utilizing, for example, heatsinks. The system 200 can be cooled using liquid cooling utilizing heat transfer fluids, among other types of cooling systems that can be utilized to cool the system 200.

The cooling components of the system 200 can cool the system 200 by cooling different components of the system 200 at different rates. For example, the cooling components may cool the processor 202, the devices 223, and the memory modules 224 at different rates. The devices 223 may be cooled by an air flow however the topography of the devices 223 on the surface of the substrate of the system 200 may cause the air flow to affect the memory modules 224 and the processor 202 differently than the air flow affected the devices 223. For example, the direction of the airflow combined with the topography of the devices 223 and/or the processor 202 may cause the different memory slots 220 to have different thermal qualities, such as different temperatures, during operation.

The airflow can be directional. The direction of the airflow of the system 200 is shown by arrow 222. The direction of the airflow is from the bottom of the system 200 to the top of the system 200 as shown in FIG. 2. However, the direction of the airflow of the system 200 is exemplary and should not be interpreted as limiting. The airflow can have a different direction than that shown herein.

Each of the memory slots 220 can be assigned a binary classification to describe a thermal quality of the memory slot 220 during operation. The memory slots 220 can be classified as cold or hot based whether the temperature of the memory slots 220 is greater than a temperature threshold. In various instances, the memory slots 220 can be ranked based on a thermal quality of the memory slot 220. For instance, the memory slots 220 can be ranked from coldest to hottest or from hottest to coldest. A temperature variation of the memory slots 220 can be caused by a distance of the memory slots 220 to the air flow source, by components blocking air flow (e.g., devices 223), and/or by proximity of the memory slots 220 to other high-power components (e.g., processor 202) of the system 200, among other causes of temperature variations of the memory slots 220.

Each of the memory modules 224 can have a performance rating of an operating parameter indicating how the memory modules 224 operate at higher temperatures as compared to how the memory modules 224 operate at lower temperatures. For examples, memory modules 224 with high cell data retention failure rates, IDD2N, or IDD3N have been found to consume more power at higher temperatures as compared to the memory modules operating at lower temperatures. Accordingly, controlling for the operating temperature of the memory modules 224 can improve the performance and retention of the semiconductor dies of the memory modules 224. As used herein, an operating temperature describes the temperature during operation. For example, an operating temperature of the memory modules 224 describes a temperature of the memory modules 224 during operation of the memory modules 224. An operating temperature of memory slots 220 can be a temperature of the memory slots during operation of the memory slots. Accordingly, the overall performance of the system 200 can be improved by mounting memory modules 224 that are relatively more temperature-affected to cold memory slots and memory modules that are relatively less temperature-effected to hot memory slots.

For example, for each of the memory modules 224, a first performance rating of an operating parameter can be determined for a first temperature. A second performance rating of the operating parameter can be determined for a second temperature. The first temperature can represent a coldest temperature at which the memory modules are expected to operate. The second temperate can represent a hottest temperature at which the memory modules are expected to operate. The first performance rating can be compared to the second performance rating to assign a classification to the memory modules 224. For example, memory modules 224 that are most effected in a negate way by operating at the hottest temperatures can be provided a fast fast (FF) classification or a join fast fast (JFF) classification. For example, memory modules 224 that are classified as FF or JFF can show a steeper leakage curve as temperatures increase.

The FF/JFF classification of dies and/or modules can be caused by process variation of semiconductor manufacturing. Different process variations can result in changed device threshold voltages. The changed device threshold voltages can result in changed active and leakage current and power of the dies and/or modules.

The memory modules that are least effected in a negative way by operating at the coldest temperatures can be provided a slow slow (SS) classification or a joint slow slow (JSS) classification. For example, memory modules 224 that are classified SS or JSS can have a more relaxed leakage curve as temperatures increase (e.g., hotter). However, memory modules 224 that are classified SS or JSS can function slows as temperatures decrees (e.g., cooler). In various instances, a plurality of performance ratings of the operating parameters can be utilized to generate and assign a classification to the memory modules 224. For example, a first and second performance ratings of a first operation parameter and a third and fourth performance ratings of a second operating parameter can be utilized go assign a classification to the memory module 224. Performance ratings for power consumption of the semiconductor die and/or the memory module, data retention of the semiconductor die, speed of the semiconductor die, and/or some combination therein can be utilized to generate the classification to the memory module 224.

The SS or JSS memory modules 224 can be placed in the hot memory slots 220 and the FF or JFF memory modules 224 can be placed in the cold memory slots 220. The FF or JF memory modules 224 can be placed in the cooler memory slots 220 to reduce power leakage and quality marginalities. The SS or JSS memory modules 224 can be placed in hotter memory slots 220 as increased temperatures have less of an impact on leakage and have better speed performance. That is, memory modules 224 with robust data retention performance can be placed in higher temperature slots to reduce the overall system data retention risk. As used herein, data retention risk descries the risk of leakage current which can negatively affect data retention.

In various examples, the memory modules 224 can also be ranked based on the performance ratings. For example, the memory modules 224 can be ranked based on leakage curve as temperatures increase and/or based on a speed of the memory modules 224 as the temperatures decrease. The leakage curve can be represented in the performance ratings such that the performance ratings can be utilized to rank the memory modules 224. The memory modules 224 can be placed on the memory slots 220 based on the rankings of the memory slots 220 and based on the rankings of the memory modules 224. For instance, memory modules 224 having steeper leakage curves in hotter temperatures can be placed in the coldest memory slots 220 prior to placing the memory modules 224 having the slower speeds at colder temperatures in the hottest memory slots 220. The memory modules 224 having the slower speeds at colder temperatures can be placed in the hottest memory slots 220 prior to placing the memory modules 224 having the steeper leakage curves in hotter temperatures in the coldest memory slots 220.

In various instance, not all of the memory slots 220 may have memory modules 224 placed thereon. For example, a single memory module can be placed on one of the memory slots 220. A single memory module can be placed on the coldest memory slot 220 for power savings. A single memory module can also be placed on the hottest memory slot 220 to maximize a speed of the memory module.

Figure 3:
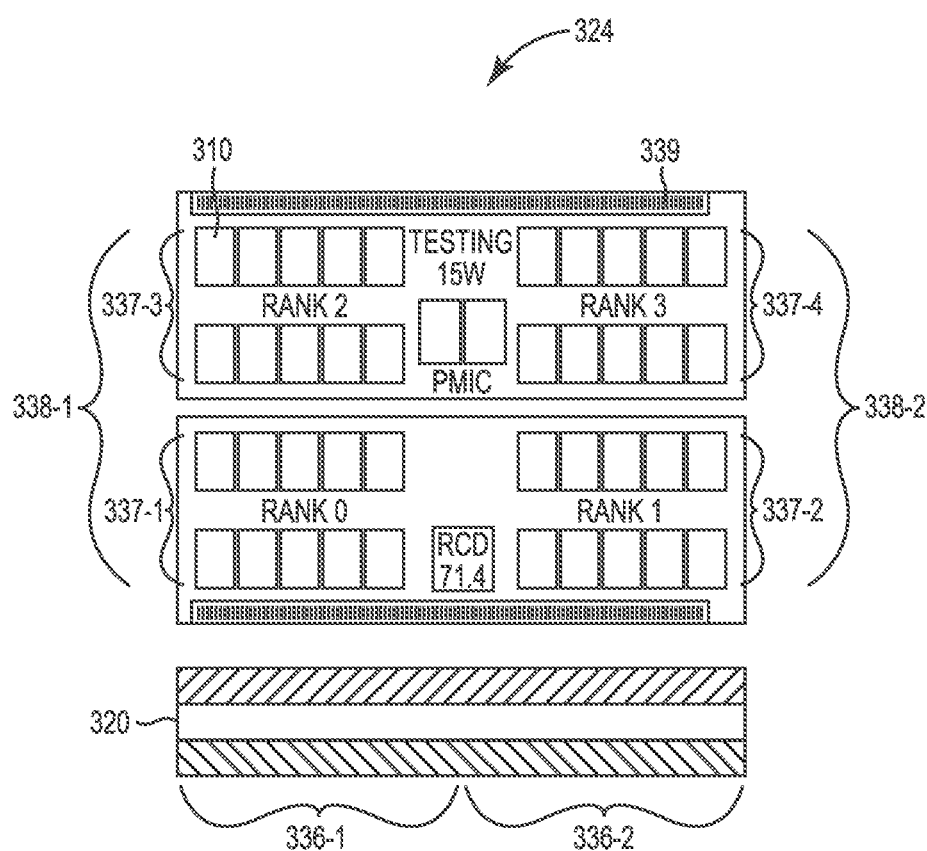
FIG. 3 illustrates a block diagram of a memory module including memory devices in accordance with a number of embodiments of the present disclosure.

FIG. 3 illustrates a block diagram of a memory module 324 including memory devices 310 in accordance with a number of embodiments of the present disclosure. FIG. 3 shows a first side and a second side of a substrate of the memory module 324. Each of the first side and the second side of the substrate can include the memory devices 310. The memory module 324 can also include pins 339.

As used herein, the pins 339 (e.g., edge connectors) physically couples a memory module 324 to a computing system. The pins 339 of the memory module are a physical interface that enables communication between the memory module 324 and the computing system. The interface coupling the memory module 324 to a host of the memory system can form a physical connection through a plurality of metal connections. The pins 339 of the interface can be composed of metals such as copper, nickel, and/or gold, among other types of metals. The pins 339 can include top pins and bottom pins. The top pins and the bottom pins can include pins formed on either side of a circuit board and are not intended to limit the orientation of the pins on the memory system 104.

The memory devices 310 can be coupled to die attach locations of an array area. The memory devices 310 can be attached to die locations of a first array area and a second array area of the memory module 324. As used herein, attaching a memory device (e.g., die) to a die location of an array area can also be described as attaching the memory device to the array area.

The memory devices 310 can be arranged into ranks 337-1, 337-2, 337-3, 338-4 and/or channels 338-1 and 338-2 within the memory module 324. The ranks 337-1, 337-2, 337-3, 337-4 can be referred to as ranks 337 and the channels 338-1, 338-2 can be referred to as channels 338.

As used herein, a rank (e.g., ranks 337) is a set of memory devices 310 connected to a same chip select which are therefore accessed simultaneously. The memory devices 310 in a rank can receive commands simultaneously from a controller.

The channels 338 can comprise the ranks 337. For example, the channel 338-1 can comprise the ranks 337-1 and a rank 337-3 implemented on the opposite side of the rank 337-1 on the circuit board. The channel 338-2 can comprise the rank 337-2 and a rank 337-4 implemented on the opposite side of the rank 337-2 on the circuit board.

Each of the channels 338 and/or ranks 337 can be associated with a region of the memory slot 320 when the memory module 324 is coupled to the memory slot 320. For example, the channel 338-1 can be in physical proximity to a region 336-1 as compared to the region 336-2. The channel 338-2 can be in physical proximity to a region 336-2 as compared to the region 336-1. The regions 336-1 and 336-2 can be referred to as regions 336.

In various examples, the memory module 324 can be selected for coupling with the memory slot 320 based on the thermal qualities of the memory slot and/or the memory module 324.

For example, the region 336-1 of the memory slot 320 can be assigned a first classification while the region 336-2 is assigned a second classification based on the thermal qualities of the first region 336-1 and the second region 336-2 during operation of the memory slot 320. The first classification and/or the second classification can be one of the cold classification or the hot classification. For instance, the region 336-1 can be assigned a cold classification while the region 336-2 is assigned a hot classification, the region 336-1 can be assigned a hot classification while the region 336-2 is assigned a cold classification, the region 336-1 can be assigned a hot classification while the region 336-2 is assigned a hot classification, or the region 336-1 can be assigned a cold classification while the region 336-2 is assigned a cold classification.

The channel 338-1 and the channel 338-2 can also be assigned a classification based on the thermal qualities of the channels 338. For instance, the channel 338-1 can be assigned an SS classification, a JSS classification, an FF classification, or a JFF classification. The channel 338-2 can also be assigned SS classification, a JSS classification, an FF classification, or a JFF classification. For example, the channel 338-1 can be assigned a JSS classification while the channel 338-2 is assigned a JSS classification, the channel 338-1 can be assigned a JFF classification while the channel 338-2 is assigned a JFF classification, the channel 338-1 can be assigned a JSS classification while the channel 338-2 is assigned a JFF classification, or the channel 338-1 can be assigned a JFF classification while the channel 338-2 is assigned a JSS classification, among other combination of classifications that can be assigned to the channels 338. As previously described, the channels 338 can be assigned a classification by generating a first performance rating of the operating parameter determined for a first temperature and a second performance rating of the operating parameter determined for a second temperature for each of the channels 338 and comparing the first performance rating to the second performance rating.

Based on the classifications of the channels 338 and the regions 336, the memory module 324 can be selected to couple to the memory slot 320. For instance, the memory module 324 can be selected for the memory slot 320 if the channel 338-1 is classified JSS, the channel 338-2 is classified JFF, the region 336-1 is classified as hot, and the region 336-2 is classified as cold or if the channel 338-1 is classified JFF, the channel 338-2 is classified JSS, the region 336-1 is classified as cold, and the region 336-2 is classified as hot. The memory module 324 can also be selected for the memory slot 320 if the channel 338-1 is classified JSS, the channel 338-2 is classified JSS, the region 336-1 is classified as hot, and the region 336-2 is classified as hot or if the channel 338-1 is classified JFF, the channel 338-2 is classified JFF, the region 336-1 is classified as cold, and the region 336-2 is classified as cold.

In various instances, the classification of the channels 338 can contribute to the classification of the memory module 324. For example, the memory module 324 can be classified as SS or JSS if the combination of the channel classifications is SS or JSS. The memory modules 324 can be classified as FF or JFF if the combination of the channel classifications is FF or JFF. A combined channel classification can describe a combining of a first classification corresponding to a first channel and a second classification corresponding to a second channel. For instance, a JSS classification corresponding to a first channel can be combined with a JFF classification corresponding to a second channel based on whether the JSS classification or the JFF classification is more predominant. The JSS classification or the JFF classification can be more predominant based on the performance ratings used to generate the JSS classification or the JFF classification. The JSS classification or the JFF classification can be more predominant based on a comparison of performance ratings corresponding to a first channel and based on a different comparison of performance ratings corresponding to a different channel.

Figure 4:
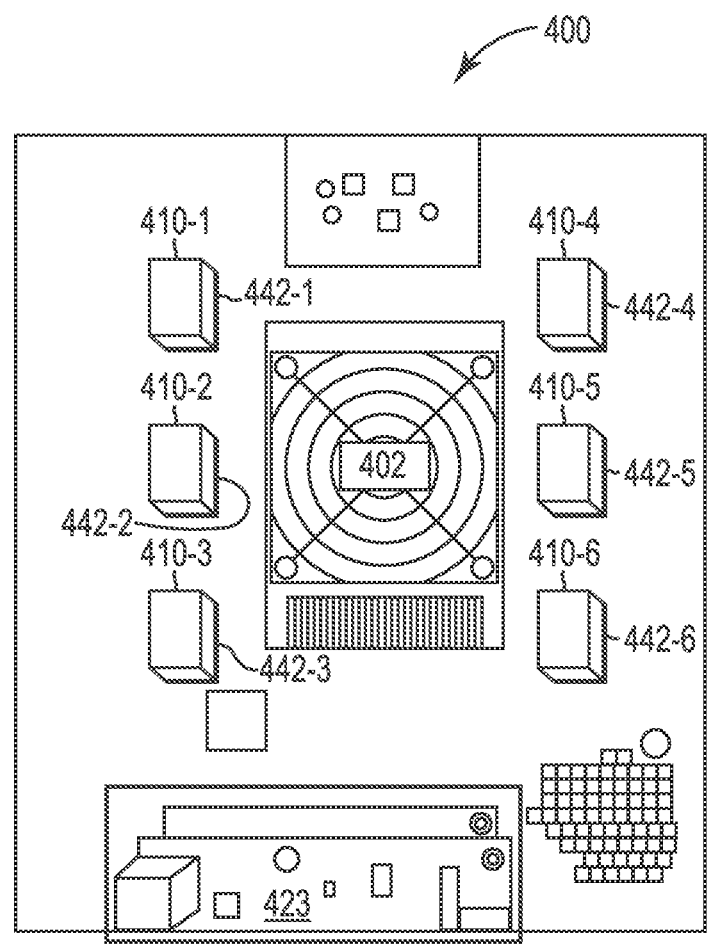
FIG. 4 illustrates a block diagram of an apparatus in the form of a computing system in accordance with a number of embodiments of the present disclosure.

FIG. 4 illustrates a block diagram of an apparatus in the form of a computing system 400 in accordance with a number of embodiments of the present disclosure. The computing system 400 includes memory devices 410-1, 410-2, 410-3, 410-4, 410-5, 410-6, referred to herein as memory devices 410. The computing system 400 also includes a processor 402 and devices 423. The memory devices 410 can be memory packages. The memory packages can encapsulate a bonded collection of memory die, for example. The memory packages can include multiple memory die.

In various instances, the memory devices 410 can be a high bandwidth memory (HBM) package that is coupled to a substrate of the memory system 400 without utilizing a memory module. The memory system 400 can include mounts 442-1, 442-2, 442-3, 442-4, 442-5, 442-6, referred to herein as mounts 442. The mounts 442 can be HBM mounts. The memory device 410-1 can be coupled to the mount 442-1, the memory device 410-2 can be coupled to the mount 442-2, the memory device 410-3 can be coupled to the mount 442-3, the memory device 410-4 can be coupled to the mount 442-4, the memory device 410-5 can be coupled to the mount 442-5, and the memory device 410-6 can be coupled to the mount 442-6. The memory devices 410 can be mounted via mounts 442 around the processor 402. Although the examples of FIG. 4 show six memory devices coupled to the mounts 442, the examples described herein can be applied to computing system comprising more or less memory devices 410 and/or mounts 442 than those shown herein.

Each of the memory devices 410 can be assigned a first performance rating of the operating parameter determined for a first temperature and a second performance rating of the operating parameter determined for a second temperature. The first performance ratings and the second performance ratings can be compared to generate a classification. That is, each of the memory devices 410 can be assigned an SS, JSS, FF, or JFF classification.

Each of the mounts 442 can also be assigned a cold or hot classification based on the thermal qualities of the mounts 442 at operation. The memory devices 410 can be mounted on the mounts 442 based on the classifications assigned to the memory devices 410 and the classifications assigned to the mounts 442. For instance, the memory device 410-1 that is assigned a JSS classification can be coupled to mount 442-1 that is assigned a hot classification. The memory device 410-2 that is assigned a JFF classification can be coupled to mount 442-2 that is assigned a cold classification, among other couplings of memory devices 410 to mounts 442.

In various examples, the memory devices 410 can be ranked based on the performance ratings of the memory devices 410. For example, the memory devices 410 can be ranked based on leakage curve as temperatures increase and/or based on a speed of the memory devices 410 as the temperatures decrease. As used herein, a different between the performance ratings of a memory device such as memory device 410-1 can define characteristics of the memory device 410-1 such as a leakage curve and/or a speed of the memory device 410-1, among other memory devices 410-2. The mounts 442 can also be ranked based on a thermal quality of the mounts 442. For instance, the mounts 442 can be ranked from coldest to hottest or from hottest to coldest.

The memory devices 410 can be coupled to the mounts 442 based on the rankings of the memory devices 410 and the rankings of the mounts 442. For example, the memory devices 410 that consume the most power at higher temperatures (e.g., FF or JFF classification) can be coupled to a coldest mount prior to mounting memory devices 410 with the lowest speeds at lower temperatures to the hottest mounts 442. Coupling the memory devices 410 to the mounts 442 in view of the rankings can provide for low power use and a higher quality system without design penalties as compared to coupling memory devices 410 to the mounts 442 at random.

Figure 5:
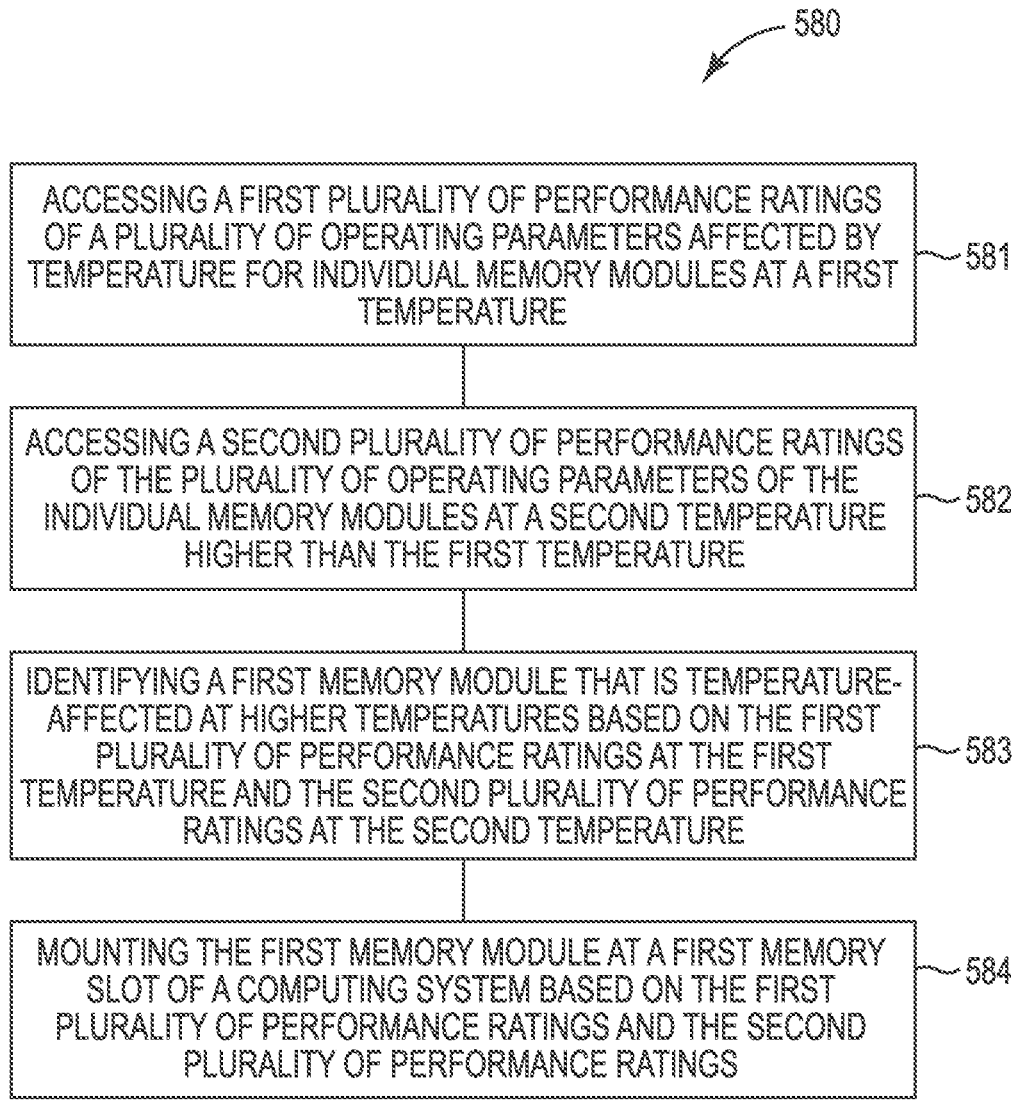
FIG. 5 illustrates an example flow diagram of a method for placing memory in a computing system in accordance with a number of embodiments of the present disclosure.

FIG. 5 illustrates an example flow diagram of a method 580 for placing memory in a computing system in accordance with a number of embodiments of the present disclosure. The method 580 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 580 is performed by the control circuitry (e.g., controller) 105 and/or by the host 102 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 581, a first plurality of performance ratings of operating parameters affected by temperature for individual memory modules at a first temperature can be accessed. The computing system can determine the first plurality of performance ratings of operating parameters and can be stored in memory. The first plurality of performance ratings can be accessed from memory, for example, and/or over a network. Each of the first plurality of performance ratings can correspond to a different one of the memory modules such that each of the memory modules has a performance rating from the first plurality of performance ratings.

At 582, a second plurality of performance ratings of the operating parameters of the individual memory modules at a second temperature higher than the first temperature can also be accessed. The computing system can also determine the second plurality of performance ratings of operating parameters and can be stored in memory. The second plurality of performance ratings can be accessed from memory, for example, and/or over a network. Each of the second plurality of performance ratings can correspond to a different one of the memory modules. As such, each of the memory modules can be associated with two performance ratings including a first performance rating from the first plurality of performance ratings and a second performance rating form the second plurality of performance ratings.

At 583, a first memory module that is temperature-affected at higher temperatures based on the first plurality of performance ratings at the first temperature and the second plurality of performance ratings at the second temperature can be identified. The term temperature-affected can describe changes in the first memory module that are attributed to a temperature at which the first memory module functions. Temperature-affected can described a degree to which the identified first memory module is affected. Generally, a function of memory modules is affected by temperature (temperature-affected) but some of the memory modules are more affected by temperature than others. A threshold can be established that defines memory modules that are more temperature-affected vs. memory modules that are less temperature-affected. The effects of a higher temperature on a memory module can be defined with regards to data retention, power usage, and/or speed of the memory modules, among other possible areas of effect on the memory module.

The higher temperature can be the second temperature. The effects on the memory module at a higher temperature can be gauged based on the first plurality of performance ratings and the second plurality of performance ratings. For example, a first memory module can be determined to be affected to a greater degree than a second memory module based on the difference between a first performance rating and a second performance rating corresponding to the first memory module and a difference between a third performance rating and fourth performance rating of a second memory module. For example, the greater the difference between the first performance rating and the second performance rating or the difference between the third performance rating and the fourth performance rating the greater the effect of temperature (e.g., higher temperature) on the first memory module and/or the second memory module, respectively.

For instance, if the difference between the first performance rating and the second performance rating is greater than the difference between the third performance rating and the fourth performance rating, then the first memory module can be more temperature-affected than the second memory module. If the difference between the third performance rating and the fourth performance rating is greater than the difference between the first performance rating and the second performance rating, then the second memory module can be more temperature-affected than the first memory module. A more temperature affected memory module can be selected.

In various instances, the first memory module can be selected not because it is more temperature affected than a different memory module but because the difference between the first performance rating and the second performance rating is greater than the threshold described above. Memory modules, that have a difference between a first performance rating and a second performance rating that is greater than the threshold, can be selected.

At 584, the first memory module can be mounted at a first memory slot of a computing system. The first memory slot can be cooler than a second memory slot of the computing system. That is, the first memory slot can be classified as cool and the second memory slot can be classified as hot. The first memory module can be classified as FF or JFF and the second memory module can be classified as SS or JSS based on the difference between a first performance rating and a second performance rating and based on the difference between the third performance rating and the fourth performance rating respectively.

In various examples, a plurality of the memory slots can remain unmounted after the first memory module is mounted to the first memory slot. As used herein, mounting a memory module to a memory slot can include coupling the memory module to the memory slot via a physical interface. In various examples, multiple of the memory modules can be mounted to multiple of the memory slots while other memory slots remain unmounted as opposed to only mounting a single memory module. In various examples, the first memory module can be mounted at the first memory slot of the computing system based on the first plurality of performance ratings, the second plurality of performance ratings, and an operating temperature corresponding to the first memory slot.

A second memory module that is not as temperature-affected as the first memory module can be identified based on the first plurality of performance ratings at the first temperature and the second plurality of performance ratings at the second temperature. The performance ratings of the first plurality of performance ratings and the second plurality of performance ratings used to identify the second memory module can be different than the performance rating of the first plurality of performance ratings and the second plurality of performance ratings used to identify the first memory module. Responsive to identifying the second memory module, the second memory module can be mounted at the second memory slot of the computing system. The first memory slot can be cooler than the second memory slot during operation.

The memory slots can be ranked from coldest to hottest or from hottest to coldest. For example, a coolest memory slot can be identified. The coolest memory slot can have a lowest temperature in the computing system during operation. That is, the coolest memory slot can have a lowest temperature as compared to the temperature of the other memory slots of the computing system during operation. The first memory module can be placed in the coolest memory slot or a memory slot that is cooler than the hottest memory slot. A hottest memory slot can also be identified. The hottest memory slot can have a highest temperature in the computing system during operation. That is, the hottest memory slot can have a highest temperature as compared to the temperatures of the other memory slots of the computing system during operation. The second memory module can be placed in the hottest memory slot or a memory slot that his hotter than the coolest memory slot.

In various examples, a coolest memory slot that is unoccupied can be identified. A memory slot can be unoccupied if it is not coupled to a memory module. The coolest memory slot that is unoccupied can have a lowest temperature of the unoccupied memory modules in the computing system during operation. That is, the coolest memory slot that is unoccupied can have a lowest temperature as compared to the temperature of the other unoccupied memory slots of the computing system during operation. The first memory module can be placed in the coolest memory slot that is unoccupied a memory slot that his hotter than the hottest memory slot that is unoccupied. A hottest memory slot that is unoccupied can also be identified. The hottest memory slot that is unoccupied can have a highest temperature as compared to the temperature of other unoccupied memory slots of the computing system during operation. That is, the hottest memory slot that is unoccupied can have a highest temperature as compared to the temperatures of the other memory slots that are unoccupied of the computing system during operation. The second memory module can be placed in the hottest memory slot that is unoccupied or a memory slot that his hotter than the coolest memory slot that is unoccupied.

The operating parameter corresponding to the first plurality of performance ratings and the second plurality of performance ratings can be power consumption from the semiconductor dies of the first memory module and the second memory module. The semiconductor dies can be, for example, the memory devices of the first memory module and the second memory module. The operating parameter can also be a speed of the semiconductor dies of a memory module and/or data retention properties of the memory module.

A third memory module that is less temperature-affected at higher temperatures than the first memory module and more temperature-affected at higher temperatures than the second memory module can be identified based on the first plurality of performance ratings at the first temperature and the second plurality of performance ratings at the second temperature. The third memory module can be mounted at a third memory slot. The third memory slot can be cooler than the second memory slot and warmer than the first memory slot during operation.

A fourth memory module that is less temperature-affected at higher temperatures than the third memory module and more temperature-affected at higher temperatures than the second memory module can also be identified based on the first plurality of performance ratings at the first temperature and the second plurality of performance ratings at the second temperature. The fourth memory module can be mounted at a fourth memory slot. The fourth memory slot can be cooler than the second memory slot during operation and warmer than the third memory slot during operation. Although the example provided herein includes four memory modules being mounted to four memory slots, other examples can include more or less than four memory modules being mounted to memory slots. In various instances, the coldest memory slots can be mounted to first prior to mounting to the hottest memory slots or the hottest memory slots can be mounted to first prior to mounting to the coldest memory slots.

In various examples, the first plurality of performance ratings and the second plurality of performance ratings can be determined using a ring oscillator. At manufacturing time, the first plurality of performance ratings and the second plurality of performance ratings can be determine using the ring oscillator. As used herein a ring oscillator is a device composed of an odd number of NOT gates in a ring whose output oscillates between two voltage levels. The first plurality of performance ratings and the second plurality of performance ratings can be determined by determining a power consumption of the individual memory modules. The power consumption of the individual memory modules can be used generate a system power characterization which can be utilized to generate the first plurality of performance ratings and the second plurality of performance ratings. The power consumption of the individual memory modules can be determined under similar conditions of the computing system.

A computing system can include a substrate having a surface, the surface having a first mount and a second mount, wherein the first mount is cooler than the second mount during operation. In various examples, the first mount can be a mounting location to which a memory package attaches without the use of a memory module.

A first memory package can be attached to the substrate in the first mount. The first memory package has a first performance rating and a second performance rating of an operating parameter affected by temperature. The first performance rating of the operating parameter can be assessed at a first temperature while the second performance rating of the operating parameter is accessed at a second temperature. The first temperature can be cooler than the second temperature. A second memory package can be attached to the substrate in the second mount. The second memory package can have a third performance rating and fourth performance rating of the operating parameter indicating that the second memory package operates more effectively than the first memory package at higher temperatures. The third performance rating can be determined for a first temperature while the fourth performance rating is determined for a second temperature. The second temperature can be hotter than the first temperature.

The first and second memory packages can comprise dies that are a same type of dies. The first and second memory packages can also comprise dies that are different types of dies. For example, the first memory package can comprise a first type of memory while the second memory package comprises a second type of memory where the first type of memory and the second type of memory are different. The first memory package can be a most temperature-affected memory package such that it has a lowest performance rating of the operating parameter of any memory package attached to the substrate at the higher temperatures. The relationship between a performance rating and a temperature-affect of a given memory package can be varied. For example, a low performance rating can be generated to indicate that a memory package is greatly affected by a temperature or is not greatly affected by the temperature.

A computing system can also include a substrate having a surface. The surface having a first memory slot and a second memory slot. The first memory slot and the second memory slots being able to couple a memory module to the computing system. The first memory slot can comprise a first region and a second region. The second memory slot can also comprise a third region and a fourth region. The first region, the second region, the third region, and the fourth region can comprise physical dimension of the first memory slot and the second memory slot. For example, the first region and the second region can comprise pins of the first memory slot while the third region and the fourth region comprise pins of the second memory slot. The first region and the second region can also describe a physical portion of the first memory slot. The third region and the fourth region can further describe a physical portion of the second memory slot. The first region and the second region can be cooler than the third region and the fourth region during operation.

A first memory module can be attached to the substrate in the first memory slot. The first memory module can have a first performance rating and a second performance rating of an operating parameter affected by temperature. The first performance rating can be for a first temperature while the second performance is for a second temperature, the second temperature being greater than the first temperature. The first performance rating can correspond to the first region of the first memory module. The first region of the first memory module can be aligned with the first region of the first memory slot. The second performance rating can correspond to the second region of the first memory module which can be aligned with the second region of the first memory slot. Each of the first performance rating and the second performance rating can be generated from two or more performance ratings of the operating parameter. For example, the first or second performance rating can be a different between two other performance ratings.

A second memory module can be attached to the substrate in the second memory slot. The second memory module can have a third performance rating and a fourth performance rating of the operating parameter affected by temperature. The third performance rating and the fourth performance rating can indicate that the second memory module operates more effectively than the first memory module at higher temperatures. Each of the third performance rating and the fourth performance rating can also be generate from two other performance ratings. For example, each of the third performance rating and the fourth performance rating can be a difference between two other performance ratings of the operating parameter. The two other performance ratings can correspond to performance ratings of a portion of the first memory module or the second memory module.

The third performance rating can correspond to third region of the second memory module aligned with the third region of the second memory slot. The fourth performance rating can correspond to a fourth region of the second memory module aligned with the fourth region of the second memory slot.

The first region and the second region together cause the first memory slot to be cooler than the second memory slot. The third region and the fourth region together can also be said to cause the second memory slot to be hotter than the first memory slot.

The first memory module can be attached to the substrate in the first memory slot such that a first channel corresponding to the first region of the first memory module is aligned with the first region of the first memory slot. The first channel can be the first region. A second channel corresponding to the second region of the first memory module can be aligned with the second region of the first memory slot. The second channel can be the second region. The aligning of the channel to the region can describe a physical proximity such that a first channel is physically closer to the first region than the second region and the second channel is physically closer to the second region than the first region after the first memory module is coupled to the first memory slot. Aligning the channel to a region of a memory slot can include aligning die (e.g., memory devices) of the channel to the region of the memory slot.

In various examples, the first channel of the first memory module can have a fifth performance rating of the operating parameter affected by temperature and the sixth performance rating of the operating parameter which can be used to generate the first performance rating. The fifth performance rating can be for a first temperature and the sixth performance rating can be for a second temperature where the second temperature is greater than the first temperature. The first performance rating can be generated using the difference between the fifth performance rating and the sixth performance rating.

The second channel of the first memory module can have a seventh performance rating of the operating parameter affected by temperature and an eight performance rating of the operating parameter which can be used to generate the second performance rating. The seventh performance rating can be for a first temperature and the eight performance rating can be for a second temperature where the second temperature is greater than the first temperature. The fifth performance rating, the sixth performance rating, the seventh performance rating, and/or the eight performance rating can indicate that the second channel operates more effectively than the first channel at higher temperatures. Given that the second channel operates more effectively than the first channel at higher temperatures, the first memory module can be coupled to the first memory slot such that the first channel is in proximity (e.g., aligned) with the first region of the first memory slot and the second channel is in proximity to the second region where the first region of the first memory slot is cooler than the second region of the second memory slot.

In various examples, the second memory module can be attached to the substrate in the second memory slot such that a first channel corresponding to the third region of the second memory module is aligned with the third region of the second memory slot. A second channel corresponding to the fourth region of the second memory module can also be aligned with the fourth region of the second memory slot.

The first channel of the second memory module can have a fifth performance rating of the operating parameter affected by temperature and a sixth performance rating of the operating parameter which can be used to generate the third performance rating. The second channel of the second memory module can have a seventh performance rating of the operating parameter affected by temperature and an eight performance rating of the operating parameter which can be used to generate the fourth performance rating. The fifth performance rating, the sixth performance rating, the seventh performance rating, and/or the eighth performance rating can indicate that the second channel operates more effectively than the first channel at higher temperatures. The third region of the second memory slot can be cooler than the fourth region of the second memory slot.

A first plurality of die of the first region of the first memory module collectively can have the first performance rating of the first memory module. A second plurality of die of the second region of the first memory module collectively can have the second performance rating of the first memory module. A third plurality of die of the third region of the second memory module collectively have the third performance rating of the second memory module. A fourth plurality of die of the fourth region of the second memory module collectively can have the fourth performance rating of the second memory module. The first plurality of die, the second plurality of die, the third plurality of die, and the fourth plurality of die can include semiconductor die.

Figure 6:
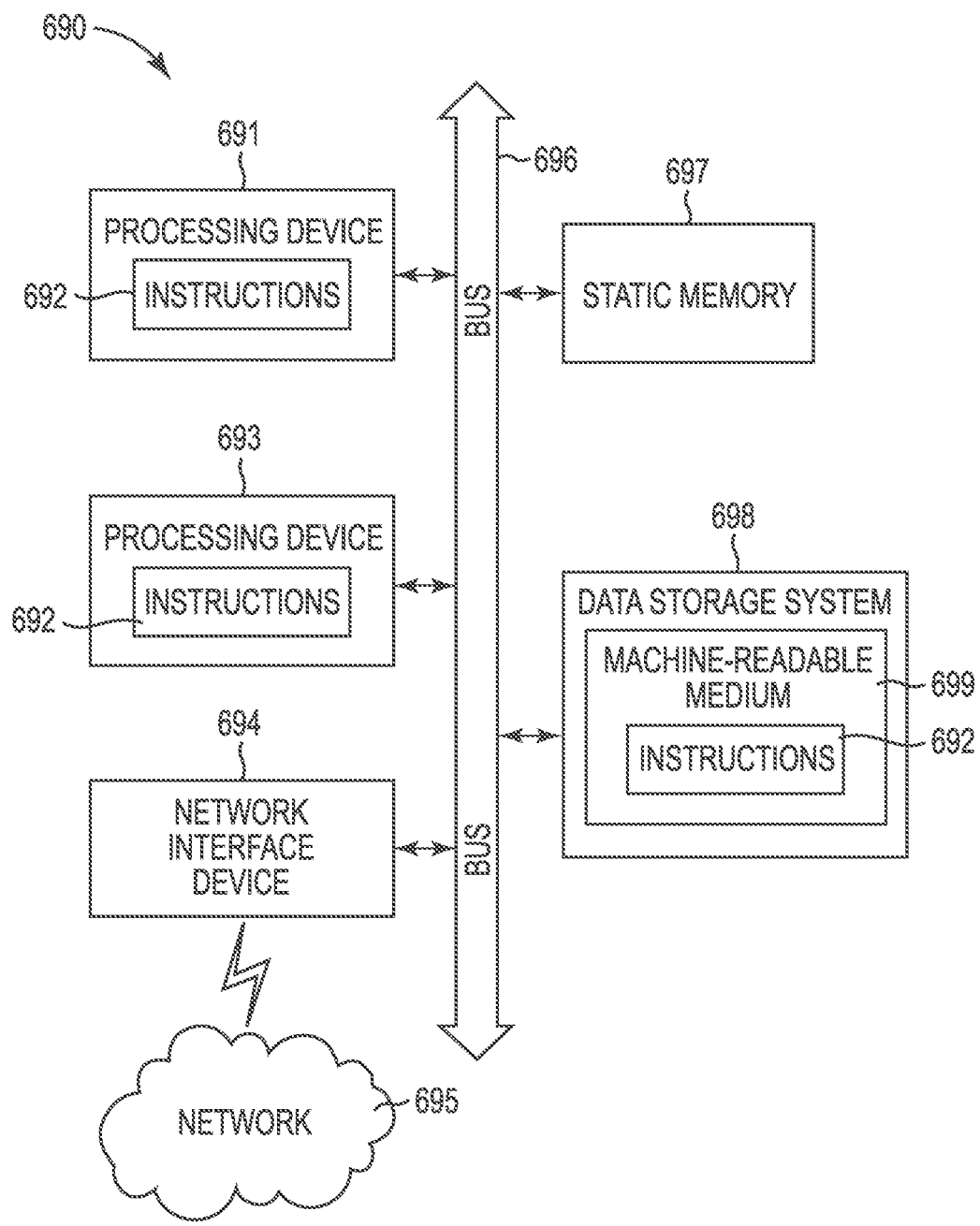
FIG. 6 illustrates an example machine of a computer system within which a set of instructions, for causing the machine to perform various methodologies discussed herein, can be executed.

FIG. 6 illustrates an example machine of a computer system 690 within which a set of instructions, for causing the machine to perform various methodologies discussed herein, can be executed. In various embodiments, the computer system 690 can correspond to a system (e.g., the computing system 100 of FIG. 1) that includes, is coupled to, or utilizes a memory sub-system (e.g., the memory device 103 of FIG. 1) or can be used to perform the operations of a controller (e.g., the controller circuitry 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 690 includes a processing device 691, a main memory 693 (e.g., read-only memory (ROM), flash memory, dynamic random access memory (DRAM) such as synchronous DRAM (SDRAM) or Rambus DRAM (RDRAM), etc.), a static memory 697 (e.g., flash memory, static random access memory (SRAM), etc.), and a data storage system 698, which communicate with each other via a bus 696.

Processing device 691 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 691 can also be one or more special-purpose processing devices such as an application specific integrated circuit (ASIC), a field programmable gate array (FPGA), a digital signal processor (DSP), network processor, or the like. The processing device 691 is configured to execute instructions 692 for performing the operations and steps discussed herein. The computer system 690 can further include a network interface device 694 to communicate over the network 695.

The data storage system 698 can include a machine-readable storage medium 699 (also known as a computer-readable medium) on which is stored one or more sets of instructions 692 or software embodying any one or more of the methodologies or functions described herein. The instructions 692 can also reside, completely or at least partially, within the main memory 693 and/or within the processing device 691 during execution thereof by the computer system 690, the main memory 693 and the processing device 691 also constituting machine-readable storage media.

In one embodiment, the instructions 692 include instructions to implement functionality corresponding to the host 102 and/or the memory device 103 of FIG. 1. While the machine-readable storage medium 699 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. A computing system, comprising:
   a substrate having a surface, the surface having a first memory slot and a second memory slot, wherein the first memory slot comprises a first region and a second region and the second memory slot comprises a third region and a fourth region and wherein the first region and the second region are cooler than the third region and the fourth region during operation;
   a first memory module attached to the substrate in the first memory slot,
      wherein the first memory module has a first performance rating and a second performance rating of an operating parameter affected by temperature, and
      wherein the first performance rating corresponds to a first region of the first memory module aligned with the first region of the first memory slot and the second performance rating corresponds to a second region of the first memory module aligned with the second region of the first memory slot;
   a second memory module attached to the substrate in the second memory slot,
      wherein the second memory module has a third performance rating and a fourth performance rating of the operating parameter affected by temperature indicating that the second memory module operates more effectively than the first memory module at higher temperatures,
      wherein the third performance rating corresponds to a third region of the second memory module aligned with the third region of the second memory slot and the fourth performance rating corresponds to a fourth region of the second memory module aligned with the fourth region of the second memory slot; and
   wherein the first memory module is attached to the substrate in the first memory slot such that a first channel corresponding to the first region of the first memory module is aligned with the first region of the first memory slot and a second channel corresponding to the second region of the first memory module is aligned with the second region of the first memory slot,
      wherein the first channel of the first memory module has a fifth performance rating of the operating parameter affected by temperature and the sixth performance rating of the operating parameter which can be used to generate the first performance rating,
      wherein the second channel of the first memory module has a seventh performance rating of the operating parameter affected by temperature and an eight performance rating of the operating parameter which can be used to generate the second performance rating,
      wherein the fifth performance rating, the sixth performance rating, the seventh performance rating, and the eight performance rating indicate that the second channel operates more effectively than the first channel at higher temperatures; and
      wherein the first region of the first memory slot is cooler than the second region of the first memory slot.

2. The computer system of claim 1, wherein the first region and the second region together cause the first memory slot to be cooler than the second memory slot.

3. The computer system of claim 1, wherein the third region and the fourth region together cause the second memory slot to be hotter than the first memory slot.

4. The computer system of claim 1, wherein the second memory module is attached to the substrate in the second memory slot such that,
   a first channel corresponding to the third region of the second memory module is aligned with the third region of the second memory slot, and
   a second channel corresponding to the fourth region of the second memory module is aligned the fourth region of the second memory slot.

5. The computer system of claim 4, wherein,
   the first channel of the second memory module has a fifth performance rating of the operating parameter affected by temperature and a sixth performance rating of the operating parameter which can be used to generate the third performance rating; and
   the second channel of the second memory module has a seventh performance rating of the operating parameter affected by temperature and an eight performance rating of the operating parameter which can be used to generate the fourth performance rating; and
   wherein the fifth performance rating, the sixth performance rating, the seventh performance rating, and the eighth performance rating indicate that the second channel operates more effectively than the first channel at higher temperatures; and
   wherein the third region of the second memory slot is cooler than the fourth region of the second memory slot.

6. The computer system of claim 1, wherein:
   a first plurality of die of the first region of the first memory module collectively have the first performance rating of the first memory module,
   a second plurality of die of the second region of the first memory module collectively have the second performance rating of the first memory module,
   a third plurality of die of the third region of the second memory module collectively have the third performance rating of the second memory module, and
   a fourth plurality of die of the fourth region of the second memory module collectively have the fourth performance rating of the second memory module.

7. An apparatus, comprising:
   a substrate having a surface, the surface having a first memory slot and a second memory slot, wherein the first memory slot comprises a first region and a second region and the second memory slot comprises a third region and a fourth region, wherein the first memory slot is cooler than the second memory slot during operation;
   a first memory module attached to the substrate in the first memory slot,
      wherein the first memory module has a first performance rating and a second performance rating of an operating parameter affected by temperature, and
   a second memory module attached to the substrate in the second memory slot,
      wherein the second memory module has a third performance rating and a fourth performance rating of the operating parameter affected by temperature indicating that the second memory module operates more effectively than the first memory module at higher temperatures;
   wherein the second memory module is attached to the substrate in the second memory slot such that a first channel corresponding to the third region of the second memory module is aligned with the third region of the second memory slot and a second channel corresponding to the fourth region of the second memory module is aligned the fourth region of the second memory slot, wherein the first channel of the second memory module has a fifth performance rating of the operating parameter affected by temperature and a sixth performance rating of the operating parameter which can be used to generate the third performance rating, wherein the second channel of the second memory module has a seventh performance rating of the operating parameter affected by temperature and an eight performance rating of the operating parameter which can be used to generate the fourth performance rating, wherein the fifth performance rating, the sixth performance rating, the seventh performance rating, and the eighth performance rating indicate that the second channel operates more effectively than the first channel at higher temperatures; and wherein the third region of the second memory slot is cooler than the fourth region of the second memory slot.

8. The apparatus of claim 7, wherein a plurality of remainder memory slots of a computing system including the substrate remain unmounted.

9. The apparatus of claim 7, wherein the first memory module at the first memory slot of the computing system is mounted based on the first performance ratings, the second performance ratings, and an operating temperature corresponding to the first memory slot.

10. The apparatus of claim 7, wherein:
the second memory module is not as temperature-affected as the first memory module based on the first performance rating at a first temperature; and
the first memory slot is cooler than the second memory slot during operation.

11. The apparatus of claim 10, wherein:
the first memory slot is identified as a coolest memory slot that is unoccupied, the coolest memory slot having a lowest temperature in the computing system during operation from unoccupied memory slots; and
the second memory slot is identified a hottest memory slot that is unoccupied, the hottest memory slot having a highest temperature in the computing system during operation from the unoccupied memory slots.

12. The apparatus of claim 10, wherein the operating parameter includes power consumption from semiconductor dies of the first memory module and the second memory module.

13. The apparatus of claim 10, further comprising:
a third memory module that is less temperature-affected at higher temperatures than the first memory module and more temperature-affected at higher temperatures than the second memory module based on the first performance rating and the second performance rating; and
a third memory slot attached to the third memory module, wherein the third memory slot is cooler than the second memory slot during operation and warmer than the first memory slot during operation.

14. The apparatus of claim 13, further comprising:
a fourth memory module that is less temperature-affected at higher temperatures than the third memory module and more temperature-affected at higher temperatures than the second memory module based on the first performance rating and the second performance ratings; and
a fourth memory slot attached to the fourth memory module, wherein the fourth memory slot is cooler than the second memory slot during operation and warmer than the third memory slot during operation.

15. The apparatus of claim 10, wherein the first performance rating and the second performance rating are determined using a ring oscillator.

16. The apparatus of claim 10, wherein the first performance rating and the second performance rating are determined by determining a power consumption of the first memory module and the second memory module.

* * * * *